(12) United States Patent
Harris

(10) Patent No.: US 7,630,557 B1
(45) Date of Patent: Dec. 8, 2009

(54) IMAGE COMPRESSION BY OBJECT SEGREGATION

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 114 days.

(21) Appl. No.: 11/684,652

(22) Filed: Mar. 12, 2007

Related U.S. Application Data

(63) Continuation of application No. 09/681,948, filed on Jun. 29, 2001, now Pat. No. 7,283,672.

(51) Int. Cl.
*G06K 9/46* (2006.01)
*G06K 9/54* (2006.01)

(52) U.S. Cl. ....................... 382/203; 382/305

(58) Field of Classification Search ............. 382/305, 382/209, 217, 224, 181, 203; 707/6, 100, 707/200; 715/515; 345/625; 348/91; 358/538
See application file for complete search history.

(56) References Cited

U.S. PATENT DOCUMENTS

| 4,457,296 A | 7/1984 | Klann |
| 5,710,590 A | 1/1998 | Ichige et al. |
| 5,717,940 A | 2/1998 | Peairs |
| 5,761,404 A | 6/1998 | Murakami et al. |
| 5,809,161 A | 9/1998 | Auty et al. |
| 6,381,365 B2 * | 4/2002 | Murakawa ............... 382/190 |
| 6,463,176 B1 | 10/2002 | Matsugu et al. |
| 6,546,119 B2 | 4/2003 | Ciolli et al. |
| 6,727,954 B1 * | 4/2004 | Okada et al. ............. 348/374 |
| 6,810,404 B1 | 10/2004 | Ferguson et al. |
| 2002/0106135 A1 | 8/2002 | Iwane |

* cited by examiner

*Primary Examiner*—Yon Couso

(57) ABSTRACT

A system of analyzing and processing images. The image is processed using machine vision techniques to find shapes and objects in the image. In one embodiment, the system finds geometric shapes and textures in the images. In another embodiment, the image processor finds actual objects in the image. Each of these items may be replaced with an indication of the item, along with difference information indicating the difference between the actual object in the image, and the object stored in the database. The difference information may include scale information, rotation information, color information and others. The information in the database may also include sub indicia, such as information about different parts of the item, and/or information about other things that may exist in the image.

6 Claims, 5 Drawing Sheets

IMAGE COMPRESSION BY OBJECT SEGREGATION

This is a divisional of U.S. application Ser. No. 09/681,948 filed Jun. 29, 2001.

BACKGROUND

Image compression may be used to reduce the size of a file that is used to represent an image. Different forms of image compression take different tactics. Many image compression systems rely on the inherent redundancy within an image.

SUMMARY

The present application teaches a system of compressing an image by segregating objects within the image, and comparing each of the segregated objects to a background part.

BRIEF DESCRIPTION OF THE DRAWINGS

These and other aspects will now be described in detail with reference to the accompanying drawings, wherein.

DETAILED DESCRIPTION

Figure 1:
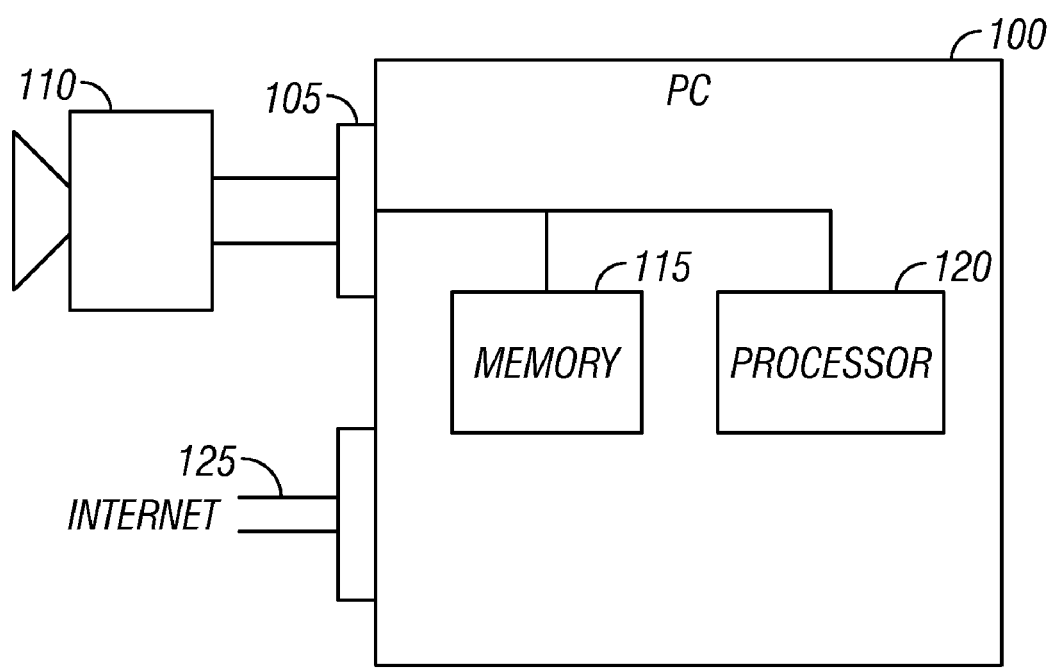
FIG. 1 shows a block diagram of hardware that may be used according to an embodiment.

The techniques disclosed in this application may be carried out in a suitably programmed computer, such as a personal computer. An exemplary hardware layout is shown in FIG. 1. The personal computer 100 includes a peripheral port 105 which may be for example a USB port. An image source 110 provides images into the peripheral port. The image source 110 may be, for example, a camera which acquires images, or a reader for a media card such as SmartMedia, or a connection to a network such as the Internet. Whenever the source, image information is received into the PC 100, and stored in the associated memory 115. The memory may be internal to the PC, such as a hard drive, or may be external such as a CD or the like. The PC also includes a processor shown as 120 which processes information including information from the memory 115. The processing is carried out according to a stored program. In one embodiment, the computer may have a connection such as 125 to a publicly available network such as the Internet.

Figure 2A:
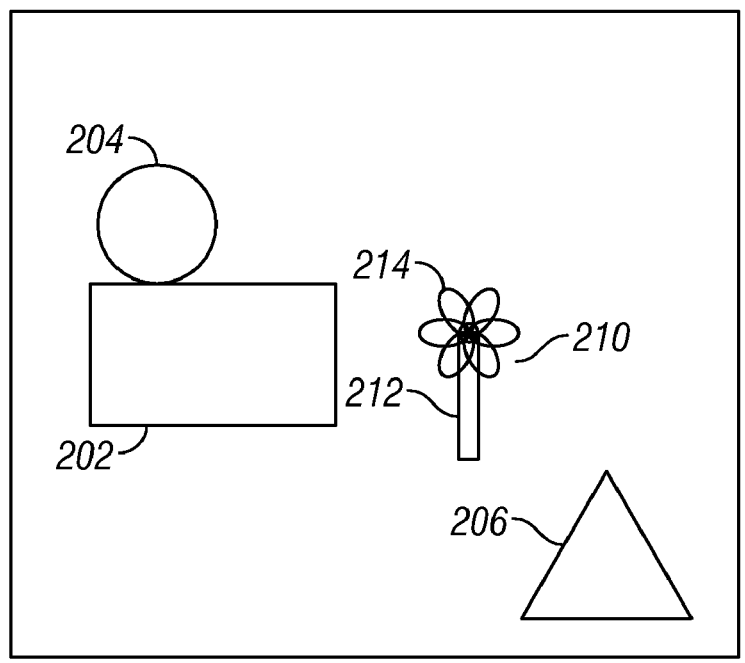
FIGS. 2A and 2B show example images, with FIG. 2A showing the image prior to compression, and FIG. 2B showing the image after certain items have been removed.
Figure 2B:
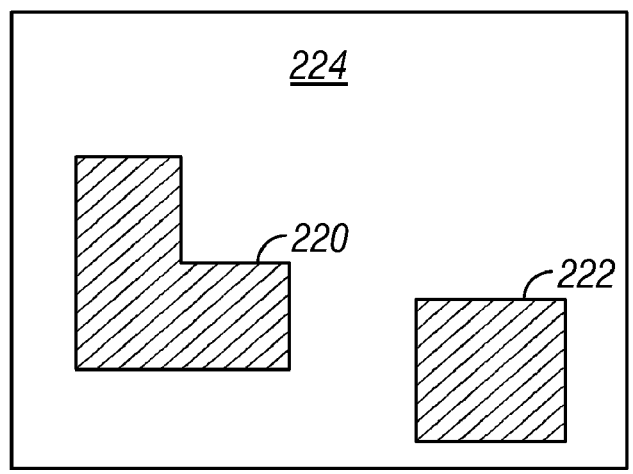

A first embodiment recognizes that real life images are often formed of different kinds of common shapes. For example, an image such as the image 200 shown in FIG. 2 may include geometric shapes such as rectangle 202, circle 204 and triangle 206. Other shapes may be present in different parts. For example, the object shown is 210 may in reality be a lamp post. However, the object 210 is formed of a cylindrical part 212 covered by a round part 214. For each item in the image, the different shapes are identified.

Figure 3:
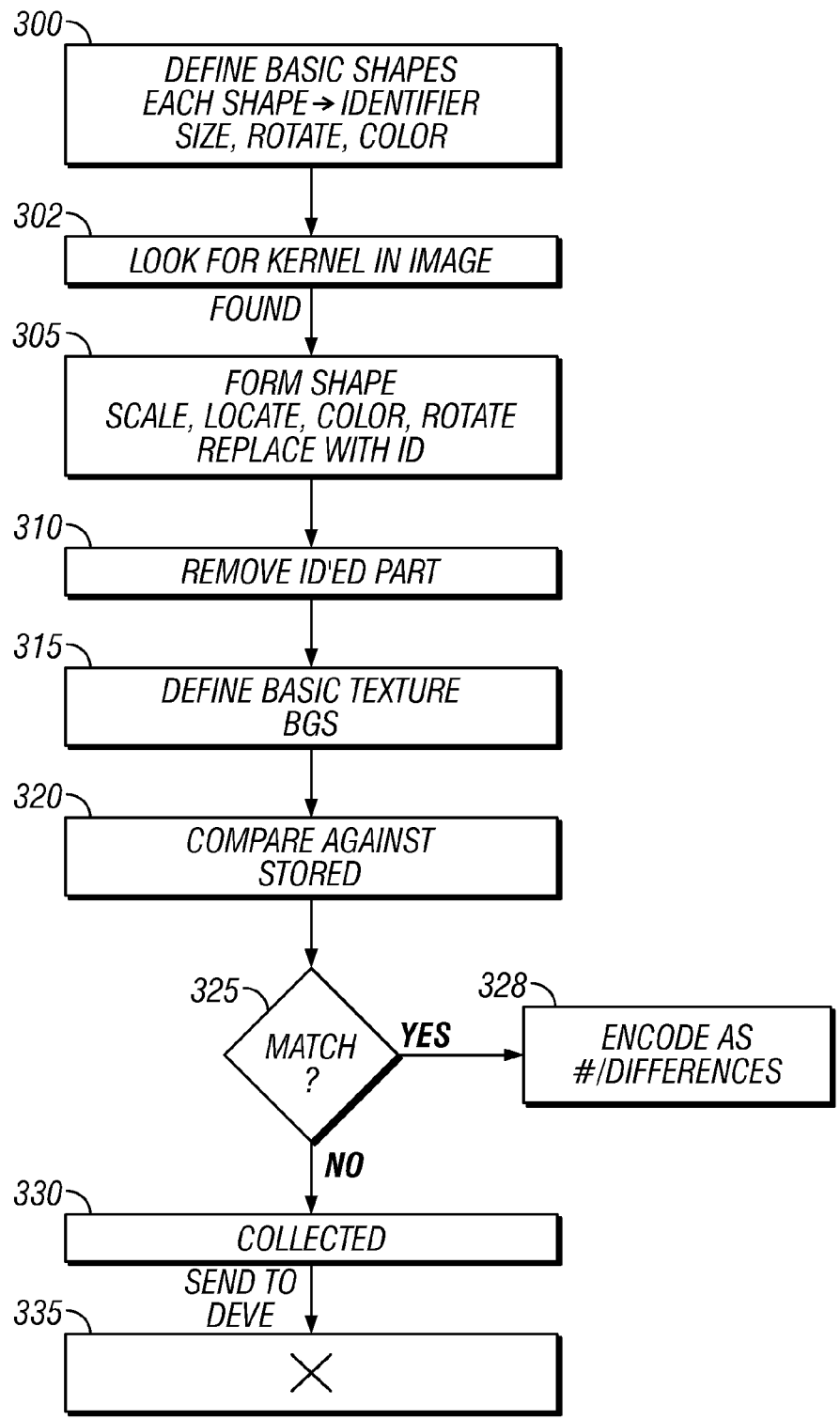
FIG. 3 shows an embodiment of a first technique of image compression.

The disclosed technique uses these techniques to compress the image, as shown in the flowchart of FIG. 3.

Initially, at 300, a plurality of the unit shapes are defined and stored. Each of these unit shapes may represent anything, but preferably may represent a basic geometric shape. Example geometric shapes may include a triangle, a square, rectangle, polygon, circle, ellipse, and more irregular shapes.

Each basic shape is assigned an identifier, which may be a number, as well as a number of different modification parameters. The modification parameters may include the following. The basic shape that is stored is a unit shape, which means that it has a size and scale of one. The size may be one of any kind of unit. The modification parameters scale from the basic unit to the final shape. The modification parameters may include size, which represents a multiplier for the unit size. For example, if the unit size is 1 cm, then a multiplier of 25 might represent that the actual device size is 25 cm. Another multiplier is the rotation multiplier. This multiplier may not be present in all shapes. For example, shapes such as a circle that are rotationally invariant may not include the rotation multiplier. Other shapes such as a rectangle, however, are initially stored in a specified orientation, e.g. with the long access parallel to the 'x' axis. Rotation may be carried out by any angle, to rotate the scale of the rectangle.

Another multiplier is for color. For example, the basic shapes may be stored in a specified color such as white. In another embodiment, each shape may be stored with a specified basic color such as a red circle, a green circle, and a blue circle. Color scaling factor may represent a mathematical difference between the actual color of the object and its unit color. For example, colors may be defined using the Web color scheme. A difference between the basic color, and the actual color, may be stored. The color may change from pixel to pixel within the basic shape, for example, so different pixels or areas may be associated with different colors. For a more complex color system, the color information may be stored as a matrix.

At 302, an image-processing kernel is used to correlate over the entire image to find any of the defined shapes. The shapes which are found may be any of a plurality of shapes stored, for example, in memory 115. A shape may be found using any conventional machine vision techniques. For example, a least mean square technique may be used by calculating differences between portions of the image, and portions of the database. When a shape is found, the control passes to 305 which replaces the found shape with an identifier in indicative of the found shape. The identifier represents a basic and unit version of the shape. The shape is also associated with information indicative of its scale, rotation, color and position. Accordingly, when a shape is found, the shape is segregated into the unit shape which may be a number representing the shape, a scale factor which may be a number representing the difference in size between the shape and the unit shape, rotation information for oriented shapes which may represent an amount of rotation for the unit shape, and color.

At 310, the identified shape is removed, leaving the rest of image without the shape. This process may be continued over the entire image. The image shown in FIG. 2B may represent an image that has been modified to remove certain shapes. Note the areas 220, 222 which are shown hatched, which represent removed areas. The remaining area 224 may again be segregated.

At 315, the remainder of the image has not been classified in terms of shapes. At this point, the rest of the image may be classified. A similar operation is carried out, where a number of basic textures and backgrounds are stored. Each area of the image is compared against these backgrounds at 320. The background which represents a sufficiently close match to the area of the "rest" is defined as a match at 325, and the background is encoded as a number representing the stored basic texture, and information indicative of differences between the actual texture and the stored image textures. The background and textures may represent common backgrounds and textures. For example, a background which represents the way an image captures a view of the sky may be very useful for portions of the image. In the background and texture encoding, the portions of the image that match this background may be defined in terms of a perimeter. That perimeter may be defined using any conventional perimeter defining technique, it e.g. vector definitions or the like.

If nothing matches within a prestored threshold, then non-matching parts of the image may be encoded using other available techniques, such as wavelet coding or a lossy coding, e.g., JPEG coding or the like.

At 330, the areas of the image which do not match may be collected. This may allow the image compression scheme to become adaptive. In the adaptive embodiment, unmatching areas may be sent to the developer at 335. The sending may be carried out in a way that avoids the developer finding out actual substantive content of the image for privacy purposes. For example, information about the background which was not properly matched, or the shape that was not properly matched, may be sent.

The developer can use this information to modify the contents of the database(s) storing the information at 335. For example, if the developer receives a certain number of indications of non-matched portions of a certain type, the developer may define a new value in one or both of the databases. This allows the compression scheme to become better and more accurate with time and use.

The encoding of the image is carried out using at least one database on the encoding computer. Decoding of the image is carried out using a database on a different, decoding computer, as described herein. Because these databases are updated over time, different versions of the software may refer to different databases. Accordingly, software updates may be used for keeping the image information up to date.

Figure 4:
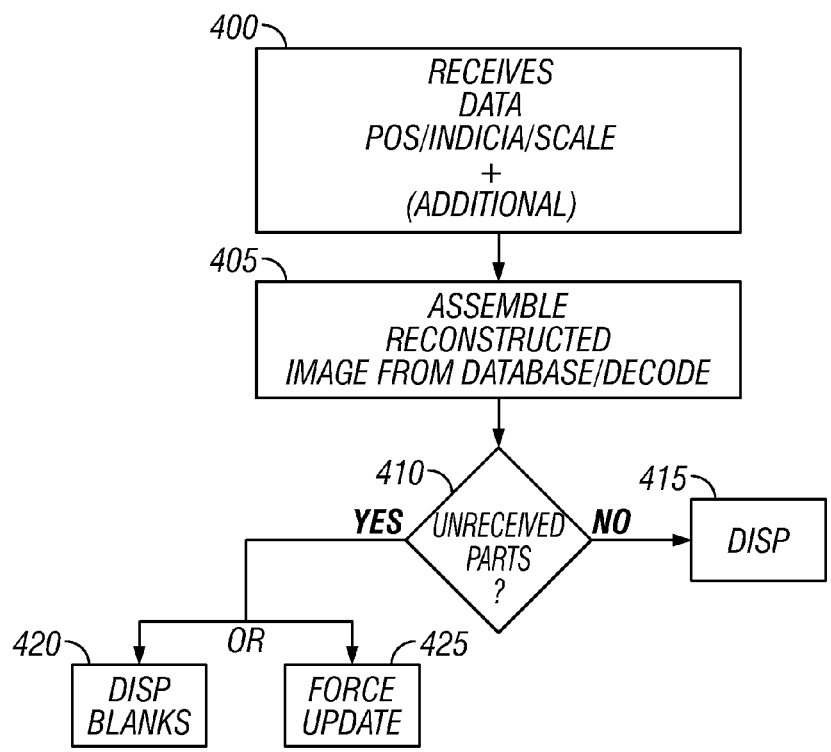
FIG. 4 shows a flowchart of decoding the image thus compressed.

The compressed image may be decoded as shown in the decoding routine in FIG. 4. At 400, the system receives data. The data includes an indicia indicating the shape or background, position information, scaling, rotation and color information for each of a plurality of different items. For a perfectly encoded image, this might be the only information that is received. However, for most real-life images, there will also be an additional part that might not have matches in the database, and hence might not be encoded according to the indicia. As described above, these other parts may be encoded as JPEG's or wavelets for example.

At 405, the system assembles a reconstructed version of the image based on the data it has received. The assembly at 405 includes using each item of data to access information from its own database, scale, rotate and color it according to the information, and place it in the image at the appropriate position. The image is thus reconstructed piece by piece, from the data that is received. The image parts stored in the database may include, as described above, basic geometric shapes, and backgrounds/textures. The additional information can also be added after the information from the database is obtained.

At 410, the system determines whether any of the data information is unrecognized. This would occur, for example, if the encoding machine had a later version of the software then the decoding machine. In this case, the data that is received could include an indicia that was not recognized by the software in the decoding machine. If there are no unrecognized parts at 410, then the reconstructed image is simply displayed at 415.

However, if there are unrecognized parts at 410, then one of two different options is carried out. These two different options may be for different versions of the software for example. For example, a freeware or shareware version of the software or low-budget version of the software may carry out the operation in 420. In this operation, the reconstruction simply displays blanks in the area of the indicia. This may require the user to manually obtain a software update, for example in order to view the image. In the higher level version of the software, shown as 425, the system automatically obtains an update over the Internet. This may first display a blank, and set some kind of flag asking the system to obtain an update the next time it is connected to the Internet. When the update is obtained, a better version of the display may then be obtained without the blanks.

In another embodiment, the image reader may be distributed as freeware or shareware, and the image reader may be freely updated without charge. Only the user of the image compression software, and not the user of the image decompression software, would have to pay for software updates.

An advantage of this system is that most of the calculations is carried out by the encoding computer. For example, the encoding computer must correlate over the entire image against the information in the database to find the closest match. Therefore, encoding must be highly calculation intensive. Decoding, on the other hand, is much less intensive. The decoding more simply requires addressing the database using the indicia to obtain a unit version of the information, reading this out, scaling, coloring, and forming a display. This may be done on relatively thin clients. In fact, this portion of the reading may actually be less calculation intensive than other compression techniques, since the read out operation obtains an already formed image part from the database.

An advantage of this system is that the image can be easily displayed on many different computers, even those with relatively small and low-power processors.

Figure 5:
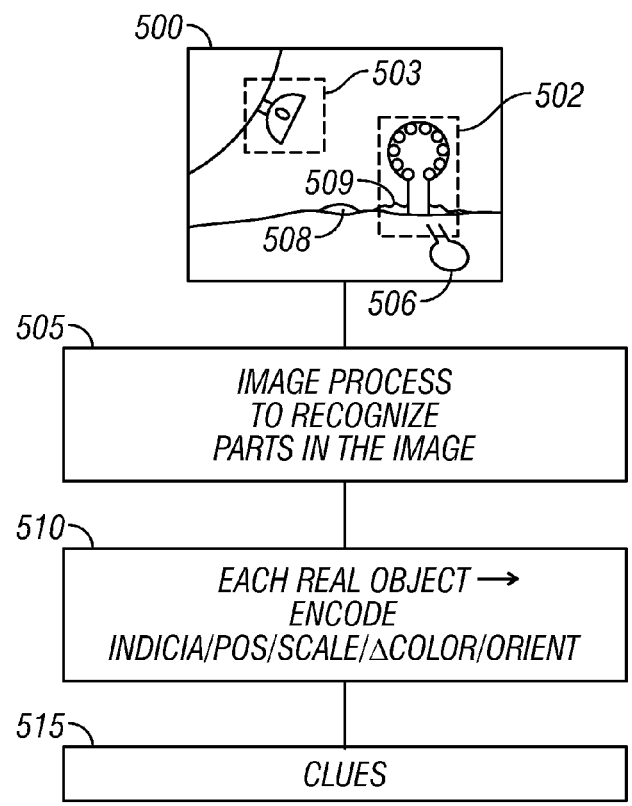
FIG. 5 shows a second compression embodiment which recognizes real parts within the image, and from those real parts obtains clues about other parts.

A second embodiment of compression is shown in FIG. 5. This embodiment uses a similar basic technique to the embodiment previously described. However, in this embodiment, instead of basic geometric shapes, the image-processing kernel analyzes and stores images of actual things. This may allow even further compression, and does so at the expense of more intelligence that is required in the encoding computer and more data being stored. This embodiment uses different information in the database, but uses the same basic decoding technique shown in FIG. 4.

At 500, an image is obtained. This image may have a number of real-life items in it. At 505, the image processing system uses machine vision techniques to recognize parts in the image and what they represent. For example, machine vision techniques made be used to recognize that the item marked as 502 is a "tree".

At 510, for each real object that is recognized, an encoding is carried out. For example, for the item 502, the image processor has recognized that this is a tree. Accordingly, at 510, the object is encoded as a tree. This includes accessing the database for a tree. The basic kernel for the tree is based on the likely characteristics of a tree. The database indicates that the tree trunk has a specified likely color e.g. brown, and a treetop has a specified likely shape and color, e.g., green and substantially circular. This basic kernel for a tree may be scaled, rotated, and modified in color.

Accordingly, each object is encoded based on its likely characteristics, and based on having recognized what the object is.

500 shows other objects, such as an outdoor street light 503, and the light projected by that light. However, a database of objects may include many more objects. For example, it may include different species and or shapes of trees. The database may include likely human faces, organized by different racial or genetic groups. It may include different body shapes of different people. In the each of these items, the object is encoded based on the indicia, position, scale, and change in color, change in orientation, and the like from the stored unit image.

At 515, the real object is used to produce clues about what else might be in the image. For example, for the tree 502, this provides clues that there may be tree roots shown as 504 around the tree. There may also be a shadow of the tree shown as 506. There may be leaves on the ground, shown as 508. All of these clues may be deduced from the fact that the tree has been recognized in the image. The clues may help the image processor to recognize other parts of the image. In addition, some of the likely indicia that occur in the image may also be stored as part of the database, to enable even further compression of the image into its component parts.

The FIG. 5 embodiment may also use the techniques in FIG. 3, i.e., it may recognize geometric shapes, in addition to real objects.

The reconstruction of the image may use the same techniques described above with reference to FIG. 4.

Another embodiment may produce even further information in the database that is used to characterize the image and hence aid in compression of the image. This may be used with the previously described embodiments, and may find special application in the second embodiment.

Figure 6:
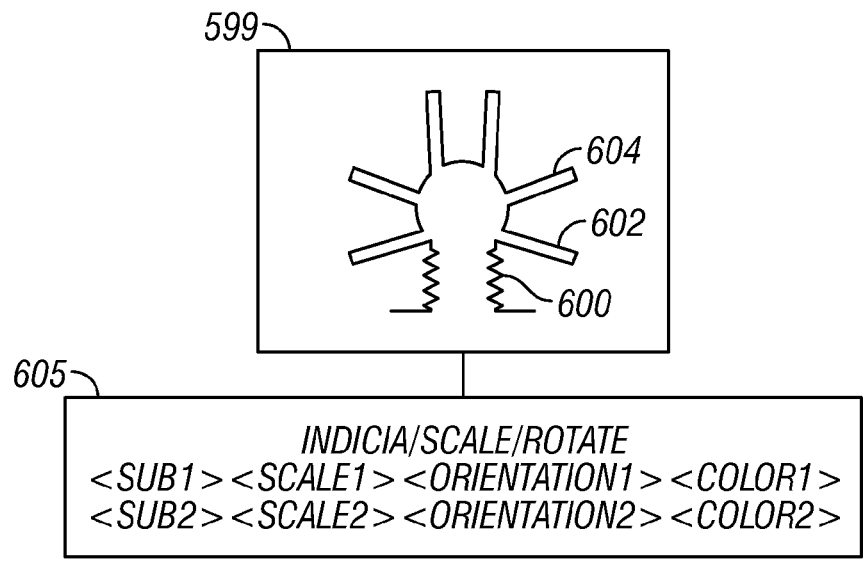
FIG. 6 shows a flowchart of another embodiment in which recognized real parts have certain sub parts.

Certain objects may have various characteristics, which may be recognizable. Accordingly, information about these characteristics may be stored, and each of the characteristics may be separately modified. FIG. 6 shows a flowchart. In FIG. 6, a special kind of tree is shown. This tree may have a trunk 600 and a number of fronds shown as 602, 604 and others. This may represent a specific kind of Palm tree. However, once the specific kind of Palm tree is identified in 599, then it is known that it is likely that the Palm tree will include a number of fronds 602, 604. Accordingly, the encoding is carried out at 605 first indicating the indicia representing the specific kind of Palm tree. As in the above, the indicia may include scale information, and rotate information. However, it in this embodiment, each of fronds such as 602 is also assigned with a sub indicia relating to the indicia of the recognized kind of palm tree. The sub indicia may itself include a scale value, for example representing length and width, an orientation value, for example representing the angle data shown in 599, and a color value. The color value for each of the fronds will presumably be very similar.

605 shows the first frond being assigned the value sub1; with scale1, orientation1, and color1.

The next sub indicia shown as sub 2 also includes a scale value, and an orientation value, since the frond 604 has a different size than the frond 602. However, the scale value scale2 is cited as relative to scale1. That is, the value scale2 may represent the difference from value scale1. In addition, the orientations may similarly represent the difference from orientations. Finally, color2 may represent the difference from color1, which will presumably be very close to zero.

Each of these values may be matrix values, representing different colors at different locations, or the like.

The FIG. 6 encoding may be otherwise just like the other encoding techniques previously described.

Figure 7:
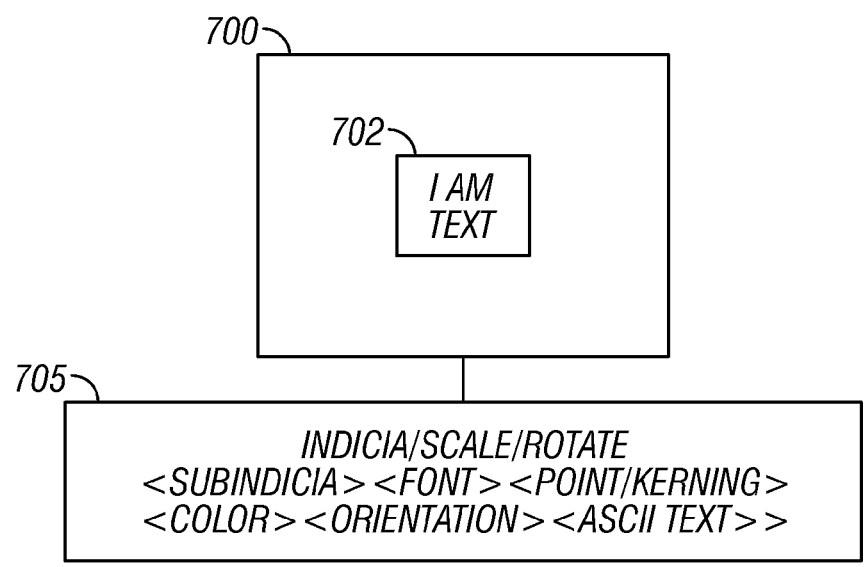
FIG. 7 shows another embodiment in which one of the sub parts can include text within the indicia.

Another embodiment, shown in FIG. 7, represents parts of the image which include characters therein. For example, real life images often include writing parts such as images shown from magazines and billboards or the like. Usually these image parts are simply treated as images, and are not separately encoded. In this embodiment, however, shown in FIG. 7, portions of the image that represent text or writing may be separately identified. For example, the image shown in 700 includes a billboard 702 within which includes textual information. The textual information can be identified once one recognizes that the item is a billboard. Accordingly, at 705, the sub indicia represents the text that is in the billboard. The sub indicia characteristics may include font information, corresponding to one of the fonts in the internal library that most closely represents the text on the billboard. Point values and kerning within the billboard may also be stored as part of the indicia. In addition, the other information that has been described above, such as color and orientation may be stored if necessary. This may be followed by the ASCII text itself, or a compressed version of the ASCII text.

Both of the embodiments in FIGS. 6 and 7 may be decoded using the FIG. 4 flowchart, by suitably adjusting the data in the database.

Although only a few embodiments have been disclosed in detail above, other modifications are possible. For example, and importantly, the above has described the system as being an image compression and decompression system. More generally, however, this system may be used to process images whether or not the size of the image is actually made smaller. All such modifications are intended to be encompassed within the following claims, in which:

What is claimed is:

1. A method comprising:
    using a computer for analyzing an electronic file that is indicative of an image to determine at least one portion representing a texture in the electronic file;
    using the computer for determining a relationship between said texture, and a basic texture and determining a modification parameter indicative of said relationship between said texture in said electronic file and said basic texture;
    using the computer storing said texture and said relationship in place of at least a section of said file; and
    using the computer for defining a perimeter of said texture in the electronic file, and storing information indicative of said perimeter in place of said section of said file.

2. A method as in claim 1, wherein said storing said texture comprises storing a number indicative of said texture in place of said section of said file.

3. A computer usable medium including a program for image compressing comprising
    computer program code that processes an electronic file that is indicative of a image, and changes said electronic file so that a first part of said electronic file is used to determine at least one section of the electronic file that represents at least one section of the image,
    computer program code that stores a first indicator indicative of a basic part indicative of said section, and a second indicator that represents a modification parameter indicative of a change to said basic part; and computer program code that forms another image portion that defines a perimeter of another section and a determination parameter indicative of what will be stored inside said perimeter.

4. A medium as in claim 3, wherein said image compressing part forms a vector that represents the perimeter.

5. A medium as in claim 3, wherein said basic part is a geometric shape.

6. A program as in claim 3, wherein said basic part is a texture.

* * * * *

UNITED STATES PATENT AND TRADEMARK OFFICE
CERTIFICATE OF CORRECTION

| | | |
|---|---|---|
| PATENT NO. | : 7,630,557 B1 | |
| APPLICATION NO. | : 11/684652 | |
| DATED | : December 8, 2009 | |
| INVENTOR(S) | : Scott C. Harris | |

It is certified that error appears in the above-identified patent and that said Letters Patent is hereby corrected as shown below:

In the specification, column 1, line 3, please change "Divisional" to --Continuation--.

Signed and Sealed this
Third Day of May, 2011

David J. Kappos
*Director of the United States Patent and Trademark Office*